(12) United States Patent
Miller et al.

(10) Patent No.: US 9,336,675 B2
(45) Date of Patent: May 10, 2016

(54) METHODS AND SYSTEMS FOR PRESENTING PRIORITIZED INCIDENT CONTENT

(71) Applicant: MOTOROLA SOLUTIONS, INC, Schaumburg, IL (US)

(72) Inventors: Trent J Miller, West Chicago, IL (US); Alejandro G Blanco, Fort Lauderdale, FL (US); Neiyer S Correal, Cooper City, FL (US); Fabio M Costa, Weston, FL (US); Kenneth W Douros, South Barrington, IL (US); Bradley M Hiben, Glen Ellyn, IL (US); Spyros Kyperountas, Weston, FL (US); Lin Lin, Fox River Grove, IL (US); Yadunandana N Rao, Sunrise, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 185 days.

(21) Appl. No.: 14/262,889

(22) Filed: Apr. 28, 2014

(65) Prior Publication Data
US 2015/0310730 A1    Oct. 29, 2015

(51) Int. Cl.
*G08B 1/08*      (2006.01)
*G08B 27/00*     (2006.01)
*G08B 25/01*     (2006.01)
*H04L 12/24*     (2006.01)
(Continued)

(52) U.S. Cl.
CPC .............. *G08B 27/001* (2013.01); *G08B 25/00* (2013.01); *G08B 25/016* (2013.01); *H04L 41/06* (2013.01); *H04L 41/0609* (2013.01); *H04L 41/22* (2013.01); *H04W 4/22* (2013.01);

*H04L 65/40* (2013.01); *H04L 67/12* (2013.01); *H04L 67/125* (2013.01); *H04L 67/22* (2013.01);
(Continued)

(58) Field of Classification Search
CPC .................................................... G08B 27/001
USPC ........................................................ 340/539.13
See application file for complete search history.

(56) References Cited

U.S. PATENT DOCUMENTS

| 6,930,608 | B2 * | 8/2005 | Grajales | ............... | A61B 5/0002 |
| | | | | | 340/573.5 |
| 7,508,840 | B2 * | 3/2009 | Delaney | .................. | H04L 41/12 |
| | | | | | 370/466 |

(Continued)

FOREIGN PATENT DOCUMENTS

WO        2013013176 A1      1/2013

OTHER PUBLICATIONS

PCT International Search Report Dated Jul. 30, 2015 for Counterpart Application PCT/US2015/026573.
(Continued)

*Primary Examiner* — Eric M Blount

(57) ABSTRACT

Disclosed herein are methods and systems for presenting prioritized incident content. One embodiment takes the form of a method that includes receiving one or more status alerts from one or more public-safety devices associated with one or more public-safety responders. The method also includes correlating one or more of the received status alerts with one or more media sessions involving one or more of the public-safety responders. The method also includes prioritizing one or more of the media sessions based on prioritization criteria that includes the one or more status alerts correlated with those media sessions. The method also includes presenting one or more of the prioritized media sessions in a chronological view on respective user interfaces of one or more public-safety communication devices.

18 Claims, 10 Drawing Sheets

(51) Int. Cl.
*G08B 25/00* (2006.01)
*H04W 4/22* (2009.01)
*H04L 29/08* (2006.01)
*H04L 29/06* (2006.01)
*H04M 3/51* (2006.01)
*H04M 11/04* (2006.01)
*H04W 76/00* (2009.01)

(52) U.S. Cl.
CPC .............. *H04L 67/306* (2013.01); *H04L 67/36* (2013.01); *H04M 3/5116* (2013.01); *H04M 11/04* (2013.01); *H04M 2242/04* (2013.01); *H04W 76/007* (2013.01)

(56) References Cited

U.S. PATENT DOCUMENTS

| | | | |
|---|---|---|---|
| 8,356,248 | B1 | 1/2013 | Killalea |
| 8,537,983 | B1 | 9/2013 | Haggerty et al. |
| 8,554,192 | B2 | 10/2013 | Ramer et al. |
| 8,665,087 | B2 * | 3/2014 | Greene ................. A62B 99/00 340/539.13 |
| 8,676,904 | B2 | 3/2014 | Lindahl |
| 9,002,384 | B1 * | 4/2015 | Hallenbeck ................... 455/457 |
| 9,135,808 | B2 * | 9/2015 | Johnson ............... G08B 25/009 |
| 2001/0033639 | A1 * | 10/2001 | Martin ................. H04M 3/5307 379/88.14 |
| 2003/0048881 | A1 * | 3/2003 | Trajkovic ............ H04M 1/6505 379/88.12 |
| 2005/0001720 | A1 * | 1/2005 | Mason ................. G01C 21/206 340/539.13 |
| 2006/0236258 | A1 * | 10/2006 | Othmer ............. G06Q 30/0243 340/8.1 |
| 2007/0098354 | A1 | 5/2007 | Ando et al. |
| 2009/0174547 | A1 | 7/2009 | Greene et al. |
| 2009/0207852 | A1 * | 8/2009 | Greene ................. H04W 28/14 340/286.02 |
| 2009/0310759 | A1 | 12/2009 | Andrassy et al. |
| 2011/0169633 | A1 | 7/2011 | Lauder et al. |
| 2012/0331378 | A1 | 12/2012 | Baioura |
| 2013/0073534 | A1 | 3/2013 | French |
| 2013/0094834 | A1 | 4/2013 | Laksono et al. |
| 2013/0262633 | A1 | 10/2013 | Goodwin et al. |
| 2013/0268620 | A1 | 10/2013 | Osminer |

OTHER PUBLICATIONS

Abrams, D. et al. "Video Content Analysis With Effective Response"; Technologies for Homeland Security, 2007 IEEE Conference on, May 1, 2007; p. 57-63, XP031175212; D01:10.1109/THS.2007. 370020; ISBN:978-1-4244-1052-1.

Tony Bradshaw, "Targeting the Source of Illegal Gunfire", Acruser—The Magazine for ESRI Software Users; Dec. 3, 2013, p. 1-4, XP055202865; Retrieved From Internet.

Abishek Thekkeyil Kunnath, et al. "Locating and Monitoring Emergency Responder Using a Wearable Device"; Advances in Computing, Communications and Informatics, New York, NY; Aug. 3, 2012; p. 1163-1168; XP058008581; D01: 10.1145/2345396, 2345582; ISBN: 978-1-4503-1196-0.

Streefkerk, JW, et al. "Designing Personal Attentive User Interfaces in the Mobile Public Safety Domain", Computers in Human Behavior, Pergamon, New York, NY; vol. 22, No. 4, Jul. 1, 2006; p. 749-770; XP028003430; ISSN:0747-5632; D01:10.1016/J.CHB.2005.12. 006.

* cited by examiner

METHODS AND SYSTEMS FOR PRESENTING PRIORITIZED INCIDENT CONTENT

BACKGROUND OF THE INVENTION

Millions of people around the world make daily use of various computing and communication devices. Many of these devices can be accurately characterized as being wireless-communication devices (WCDs), in that they are equipped and configured such that they are able to engage in wireless forms of communication directly with one another and/or via various wireless networks. Examples of commonly used WCDs include cell phones, smartphones, tablets, notebook computers, laptop computers, and the like. The wireless networks—via which these WCDs engage in wireless communication—typically operate according to one or more relatively long-range wireless-communication protocols (e.g., Long-Term Evolution (LTE) and the like) and/or one or more relatively short-range wireless-communication protocols (e.g., Wi-Fi and the like).

One context in which fast and reliable communication is especially important is the public-safety context. This is a context in which the immediacy and efficacy with which public-safety responders can respond to an incident are quite often determinative with respect to how positive the ultimate outcome of the incident can be. Indeed, public-safety incidents are often quite complicated, and quite often involve public-safety responders from multiple disciplines (e.g., police, fire, EMS, other governmental entities, and the like), and indeed quite often even involve public-safety responders from different governments and agencies even within the same discipline (e.g., county fire, city fire, and the like). As such, it is not unusual even in the context of a single public-safety incident (which could last an extended time) for public-safety responders to generate numerous instances of incident content (e.g., talkbursts, other audio, video, event logs, and the like). Accordingly, for at least the reason that it is important to improve the incident-related situational awareness of these responders, there is a need for methods and systems for presenting prioritized incident content.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
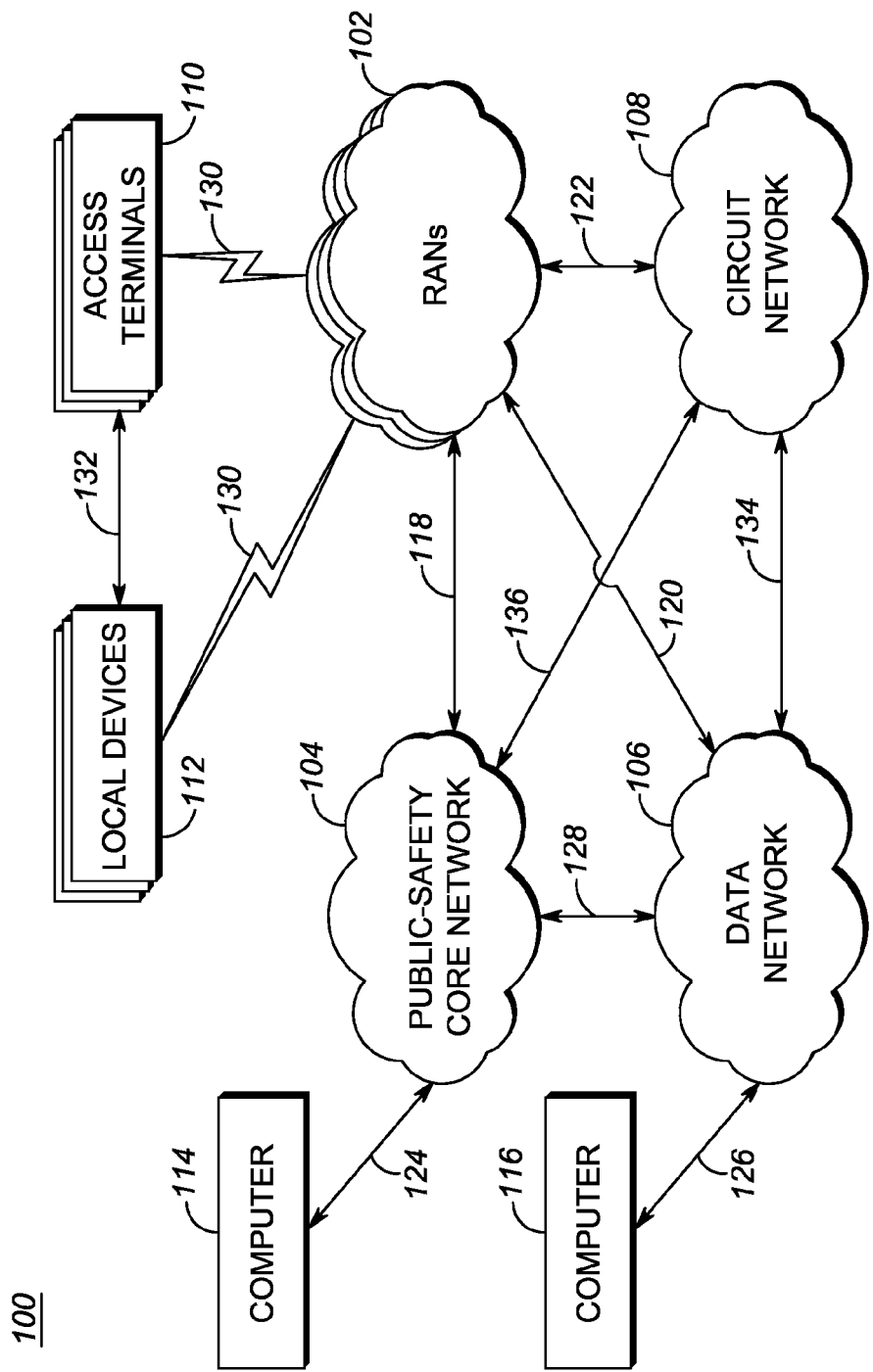
FIG. 1 depicts an example communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for presenting prioritized incident content. One embodiment takes the form of a method that includes receiving one or more status alerts from one or more public-safety devices associated with one or more public-safety responders. The method also includes correlating one or more of the received status alerts with one or more media sessions involving one or more of the public-safety responders. The method also includes prioritizing one or more of the media sessions based on prioritization criteria that includes the one or more status alerts correlated with those media sessions. The method also includes presenting one or more of the prioritized media sessions in a chronological view on respective user interfaces of one or more public-safety communication devices.

Another embodiment takes the form of a system that includes a communication interface, a processor, and data storage containing instructions executable by the processor for causing the system to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

In at least one embodiment, correlating one or more of the received status alerts with one or more of the media sessions involves correlating one or more of the received status alerts with one or more of the media sessions based at least in part on one or more of timestamp data, location data, and an incident identifier.

In at least one embodiment, at least one of the received status alerts indicates a state of one or more sensors of one or more of the public-safety devices, and the prioritization criteria further includes the indicated status of the one or more sensors.

In at least one embodiment, at least one of the received status alerts indicates one or more output values from one or more analytics, and the prioritization criteria further includes the indicated one or more output values from the one or more analytics.

In at least one embodiment, at least one of the received status alerts indicates a state of at least one of the public-safety responders, and the prioritization criteria further includes the indicated state of the at least one public-safety responder.

In at least one embodiment, at least one of the received status alerts indicates incident-definition data; the prioritization criteria further includes the indicated incident-definition data, which itself includes one or more of recentness of incident creation, incident type, an indication of users or equipment assigned to the incident, and incident location.

In at least one embodiment, the prioritization criteria further includes one or more of a given status alert originating from dispatch, a frequency of receipt of one or more of the status alerts, and a severity level of one or more of the status alerts.

In at least one embodiment, the prioritization criteria further includes media-session metadata associated with the one or more media sessions.

In at least one of the embodiments in which the prioritization criteria includes media-session metadata associated with the one or more media sessions, the media-session metadata indicates one or more of start time, stop time, duration, listing of participants, identification of media-session initiator, identification of source of media-session content, location of one or more participants, agency role of one or more participants, incident role of one or more participants, training history of one or more participants, work history of one or more participants, certifications of one or more participants, communication channel, and a group identifier.

In at least one of the embodiments in which the prioritization criteria includes media-session metadata associated with the one or more media sessions, the media-session metadata includes data derived from applying to one or more of the media sessions one or more of speech-data analysis, video-data analysis, image-data analysis, object-recognition analysis, activity-recognition analysis, and textual analysis, and the prioritization criteria further includes the derived data. In at least one such embodiment, the derived data indicates an identification of one or more of a weapon, an object of interest, a person of interest, a voice of interest, a word of interest, a phrase of interest, a location of interest, a building of interest, a vehicle of interest, and a situation of interest.

In at least one of the embodiments in which the prioritization criteria includes media-session metadata associated with the one or more media sessions, the following function is also carried out: tracking viewing data for inclusion in the media-session metadata; the viewing data includes one or more of total number of viewings, frequency of viewings, recentness of most recent viewing, and identification of one or more viewers; and the prioritization criteria further includes the tracked viewing data.

In at least one of the embodiments in which the prioritization criteria includes media-session metadata associated with the one or more media sessions, the media-session metadata includes data indicative of a stress level of one or more individuals, and the prioritization criteria further includes the one or more indicated stress levels.

In at least one embodiment, the prioritization criteria further includes a user-profile record that is associated with the public-safety communication device.

In at least one of the embodiments in which the prioritization criteria includes a user-profile record that is associated with the public-safety communication device, the user-profile record includes data indicative of one or more of a user identifier, a user identity, an agency affiliation, an agency role, an incident role, a rank, a group identifier, and a hierarchical relationship.

In at least one of the embodiments in which the prioritization criteria includes a user-profile record that is associated with the public-safety communication device, the user-profile record includes data indicative of a rule set associated with the user-profile record. In at least one such embodiment, at least part of the rule set is user-configurable. In at least one such embodiment, at least part of the rule set is not user-configurable.

In at least one embodiment, the following function is also carried out: presenting one or more media sessions other than the prioritized media sessions; in at least one such embodiment, presenting one or more of the prioritized media sessions involves emphasizing via the user interface the one or more presented prioritized media sessions with respect to the one or more other media sessions.

In at least one embodiment, presenting one or more of the prioritized media sessions involves presenting at least one status alert as being correlated with at least one of the presented prioritized media sessions.

Before proceeding with the detailed description of the figures, it is explicitly noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as constructively preceded by a clause such as "In at least one embodiment, . . . . " And it is for reasons akin to brevity and clarity of presentation that this implied leading clause is not repeated ad nauseum in the following detailed description of the figures.

FIG. 1 depicts an example communication system 100 that includes one or more radio access networks (RANs) 102, a public-safety core network 104, a data network 106, a circuit network 108, access terminals 110, local devices 112, a computer 114, a computer 116, and communication links 118-136. Furthermore, it is noted that the arrangement that is presented in FIG. 1 is by way of example and not limitation; in some embodiments, one or both of a local area network (LAN) and an incident area network (IAN) is deployed for at least the reason of connecting the local devices 112 to one another at or about an incident scene; moreover, prioritization criteria as discussed throughout this disclosure could be stored in one or more of the RANs 102, the public-safety core network 104, the data network 106, the circuit network 108, a LAN, an IAN, and/or in any other devices and/or networks deemed suitable by those of skill in the art in a given implementation or for a given context.

An example RAN 102 is discussed below in connection with FIG. 2, though in general, each RAN 102 includes typical RAN elements such as base stations, base station controllers (BSCs), routers, switches, and the like, arranged, connected, and programmed to provide wireless service to user equipment (e.g., access terminals 110, local devices 112, and the like) in a manner known to those of skill in the relevant art.

The public-safety core network 104 may include one or more packet-switched networks and/or one or more circuit-switched networks, and in general provides one or more public-safety agencies with any necessary computing and communication needs. Thus, the public-safety core network 104 may include a dispatch center communicatively connected with the data network 106 and also with the circuit network 108, for retrieving and transmitting any necessary public-safety-related data and communications. The public-safety core network 104 also includes any necessary computing, data-storage, and data-presentation resources utilized by public-safety personnel in carrying out their public-safety functions. Moreover, the public-safety core network 104 includes one or more network access servers (NASs), gateways, and the like for communicating with one or more other entities and/or networks, such as the RANs 102, the data network 106, the circuit network 108, and the computer 114, as representative examples.

The data network 106 may be, include, or be a part of the global network of interconnected networks typically referred to as the Internet. The data network 106 may be a packet-switched network, and entities (i.e., servers, routers, computers, and the like) that communicate over the data network 106 may be identified by a network address such as an Internet Protocol (IP) address. Moreover, the data network 106 includes one or more NASs, gateways, and the like for communicating with one or more other entities and/or networks, such as the RANs 102, the public-safety core network 104, the circuit network 108, and the computer 116, as representative examples.

The circuit network 108 may be, include, or be a part of the circuit-switched telephone network commonly referred to as the public switched telephone network (PSTN), and in general functions to provide circuit-switched communications to various communication entities as is known in the relevant art. Moreover, the circuit network 108 includes one or more NASs, gateways, and the like for communicating with one or more other entities and/or networks, such as the RANs 102, the public-safety core network 104, and the data network 106, as representative examples.

The access terminals 110 may be any suitable computing and communication devices configured to engage in wireless communication with the RANs 102 over the air interface 130 as is known to those in the relevant art. Moreover, one or more access terminals 110 are further configured to engage in wired and/or wireless communication with one or more local devices 112 via the communication link 132. Some example access terminals 110, local devices 112, communication links 130, and communication links 132 are discussed below in connection with the various figures.

Any one or more of the communication links 118-136 could include one or more wireless-communication links and/or one or more wired-communication links. In FIG. 1, the communication link 130, which represents the one or more air interfaces provided by the one or more RANs 102, is depicted with a lightning-bolt graphic between RANs 102 and access terminals 110, and also between RANs 102 and local devices 112; while this graphic typically denotes wireless communication, and does in this example as well, this is not to the exclusion of one or more of the other communication links 118-128 and 132-136 being or at least including wireless-communication links as well.

As can be seen in FIG. 1, the communication link 118 connects the RANs 102 and the public-safety core network 104; the communication link 120 connects the RANs 102 and the data network 106; the communication link 122 connects the RANs 102 and the circuit network 108; the communication link 124 connects the public-safety core network 104 and the computer 114; the communication link 126 connects the data network 106 and the computer 116; the communication link 128 connects the public-safety core network 104 and the data network 106; the communication link 130 (as mentioned above) connects the RANs 102 and the access terminals 110, and also connects the RANs 102 and the local devices 112; the communication link 132 connects the access terminals 110 and the local devices 112; the communication link 134 connects the data network 106 and the circuit network 108; and the communication link 136 connects the public-safety core network 104 and the circuit network 108. This arrangement is provided purely by way of example, as other arrangements could be implemented by those of skill in the relevant art in various different contexts.

Figure 2:
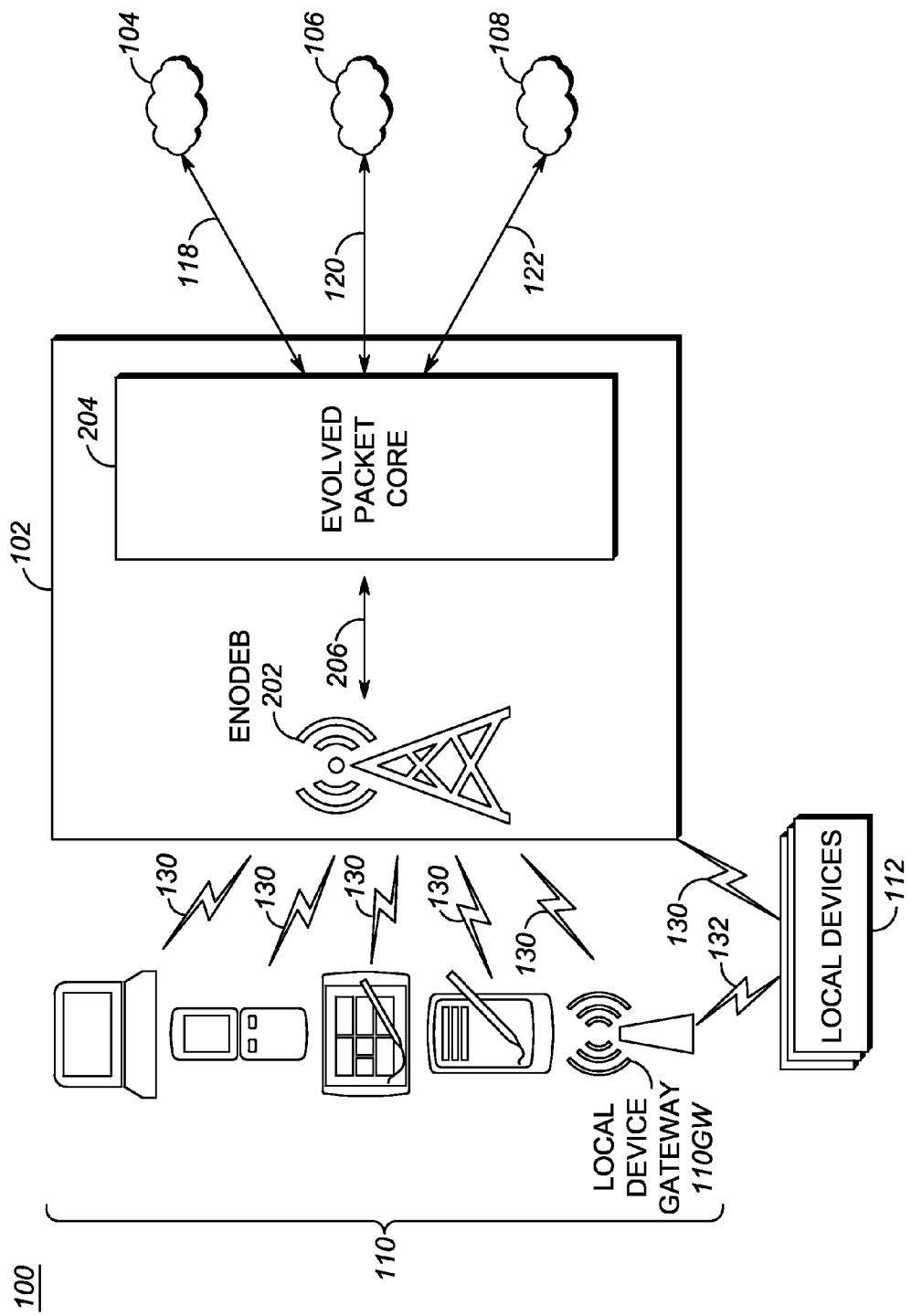
FIG. 2 depicts the example communication system of FIG. 1.

FIG. 2 also depicts the communication system 100 of FIG. 1, though does so with additional detail regarding some example access terminals 110 and an example RAN 102. FIG. 2 depicts a plurality of access terminals 110 communicating over the air interface 130 with the RAN 102, and also depicts one or more of a plurality of local devices 112 communicating over the air interface 130 with the RAN 102. Furthermore, FIG. 2 depicts a particular access terminal 110, namely a local device gateway 110GW, communicating over the local air interface 132 with one or more of the local devices 112. FIG. 2 further depicts the RAN 102 being communicatively connected to the networks 104, 106, and 108 via the communication links 118, 120, and 122, respectively.

In addition to depicting those entities and aspects that are also depicted in FIG. 1, FIG. 2 depicts some additional detail regarding the example RAN 102. Indeed, FIG. 2 depicts the RAN 102 as including an eNodeB 202 and an evolved packet core (EPC) 204 communicatively coupled with one another by a communication link 206. As is the case with the communication links mentioned above, and as is the case with any of the communication links mentioned anywhere else in this disclosure, the communication link 206 may be or include one or more wireless communication links and/or one or more wired communication links, as deemed suitable by those of skill in the relevant art for a given implementation or in a given context.

The eNodeB 202 includes the hardware and software (and/or firmware) necessary for the eNodeB 202 to function as an eNodeB, a NodeB, a base station, a base transceiver station (BTS), an access point, and/or the like, as known to those having skill in the relevant art. In some instances, the eNodeB 202 may also include functionality typically associated in the art with entities that are typically referred to by terms such as base station controllers (BSCs), radio network controllers (RNCs), and the like.

In general, the eNodeB 202 is the entity that, on one side (i.e., the wireless-network side (interface)), engages in wireless communication over the air interface 130 with one or more access terminals 110 according to a wireless-communication protocol such as LTE or the like and, on the other side (i.e., the "backhaul" side), engages in communications with the EPC 204 via the communication link 206, so as to facilitate communications between various access terminals 110 and networks such as the networks 104, 106, and 108. Furthermore, although the example RAN 102 is depicted in FIG. 2 as having only a single eNodeB 202, those having skill in the relevant art know that a given RAN 102 may include numerous eNodeBs 202 that communicate with a core network such as the EPC 204 directly or via one or more other network entities.

The EPC 204 may include one or more network entities such as one or more mobility management entities (MMES), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the access terminals 110 via the eNodeB(s) 202, and to bridge such wireless service with various transport networks. In general, an example RAN 102 may provide wireless service according to a protocol such as LTE, WiMAX, Wi-Fi, and/or the like. These examples are provided for illustration and not by way of limitation; moreover, those of skill in the relevant art are aware of variations among different protocols and among different implementations of a given protocol, and for similarities across different protocols.

Figure 3:
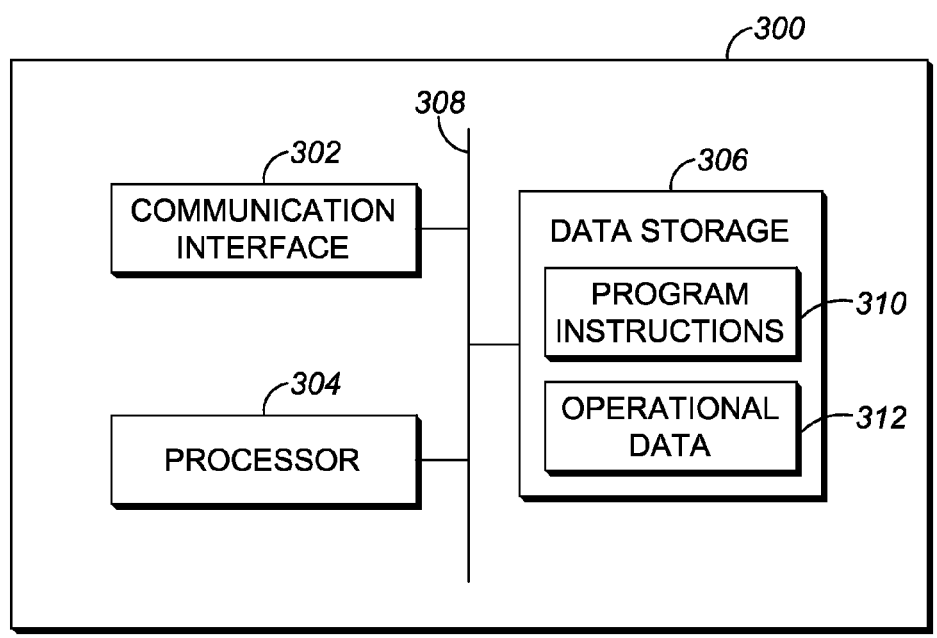
FIG. 3 depicts an example computing and communication device.

FIG. 3 depicts an example computing and communication device (CCD) 300 as including a communication interface 302, a processor 304, and a data storage 306, all of which are communicatively coupled with one another via a system bus (or other suitable connection, network, or the like) 308.

The communication interface 302 may include one or more wireless-communication interfaces (for communicating according to, e.g., LTE, Wi-Fi, Bluetooth, and/or one or more other wireless-communication protocols) and/or one or more wired-communication interfaces (for communicating according to, e.g., Ethernet, USB, and/or one or more other wired-communication protocols). As such, the communication interface 302 may include any necessary hardware (e.g., chipsets, antennas, Ethernet cards, etc.), any necessary firmware, and any necessary software for conducting one or more forms of communication with one or more other entities as described herein. The processor 304 may include one or more processors of any type deemed suitable by those of skill in the relevant art, some examples including a general-purpose microprocessor and a dedicated digital signal processor (DSP).

The data storage 306 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, the data storage 306 contains program instructions 310 executable by the processor 304 for carrying out various functions. In an embodiment in which a computing system such as the example CCD 300 is arranged, programmed, and configured to carry out methods such as the method 600 described below, the program instructions 310 are executable by the processor 304 for carrying out those functions; in instances where other entities described herein have a structure similar to that of the example CCD 300, the respective program instructions 310 for those respective devices are executable by their respective processors 304 to carry out functions respectively performed by those devices.

In various different embodiments, a device (or system that includes multiple devices) such as the example CCD 300 could be suitably equipped, programmed, and configured to carry out the one or more functions described in this disclosure as being carried out by any one or any combination of the entities described herein and/or any other suitable computing and communication devices. In some embodiments, a device or system such as the CCD 300 could be equipped, programmed, and configured to carry out the method 600 that is described below. Moreover, any one or more of the entities described herein could have an architecture or arrangement similar to that described in connection with the CCD 300. Examples such entities include: one or more entities in one or more of the example RANs 102 (e.g., an eNodeB 202, the EPC 204); one or more entities in one or more of the networks 104, 106, and/or 108; one or more of the access terminals 110 (including but not limited to the local device gateway 110GW); one or more of the local devices 112; one or both of the computers 114 and 116; the entities 402-410 of FIG. 4; the prioritization server 506 and the public-safety communication device 512 of FIG. 5; and/or any other entities disclosed herein or similar thereto.

Figure 4:
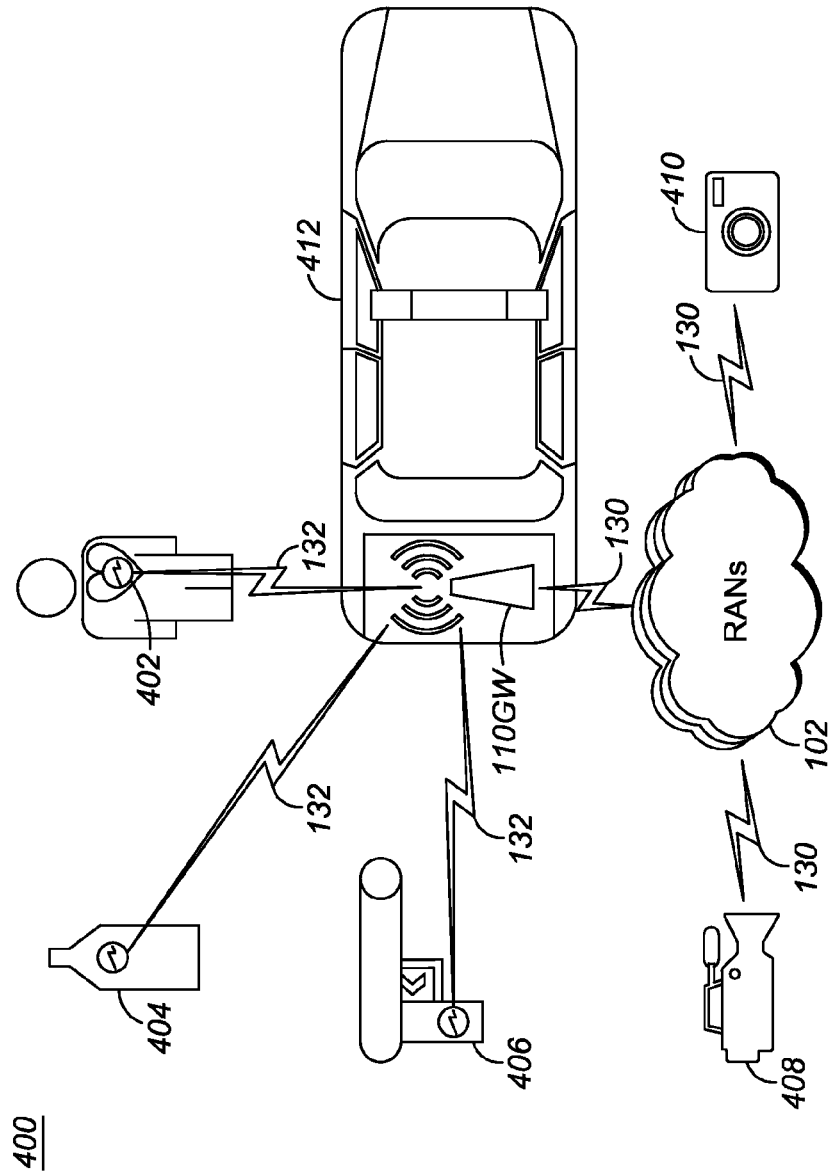
FIG. 4 depicts an example scenario involving multiple public-safety devices.

FIG. 4 depicts an example scenario 400 involving multiple public-safety devices 402-410, which are presented by way of example and not limitation, as different numbers of public-safety devices and/or different public-safety devices may be used in different contexts without departing from the scope of this disclosure. As depicted in the example scenario 400 of FIG. 4, some public-safety devices (e.g., public-safety devices 408 and 410) may fall under the category of being access terminals 110; consistent with that categorization, those public-safety devices communicate over the air interface 130 with the RANs 102. As is also depicted in the example scenario 400 of FIG. 4, some public-safety devices may fall under the category of being local devices 112; consistent with that categorization, those public-safety devices communicate over the local air interface 132 with the local device gateway 110GW, which is depicted by way of example in FIG. 4 as residing on or within a public-safety vehicle (e.g., a police cruiser), and which in turn communicates over the air interface 130 with the RANs 102. And certainly other arrangements could be used as well, as known to those in the art.

The public-safety device 402 is or at least includes a heart monitor configured to monitor a heart rate of a given public-safety responder, and may be configured to read the heart rate, and perhaps to transmit that value at periodic increments; such a heart monitor may also or instead be configured to transmit an alert when the monitored heart rate falls below a minimum threshold, exceeds an upper threshold, and the like. And certainly other particular configurations and uses are possible.

The public-safety device 404 is an oxygen sensor on an oxygen tank (or perhaps the public-safety device 404 is the oxygen tank having such an oxygen sensor); the oxygen sensor is configured to read an oxygen level in the tank, and perhaps to transmit that value at periodic increments; such an oxygen sensor may also or instead be configured to transmit an alert when the oxygen level in the tank falls below a given threshold, or may have multiple alerts configured to correspond to falling below multiple respective thresholds. And certainly other particular configurations and uses are possible. Moreover, any given sensor or other public-safety device could communicate wirelessly with a gateway such as the local device gateway 110GW, but could also or instead be configured to communicate wirelessly with another local device 112 that in turn would communicate with a gateway such as the local device gateway 110GW; and furthermore, any given sensor or other public-safety device could also or instead be configured to communicate wirelessly with the RANs 102 over the air interface 130. And certainly numerous other configurations are possible, as known to those of skill in the relevant art.

The public-safety device 406 is a weapon-drawn sensor (or perhaps a gun or other weapon having such a sensor). The weapon-drawn sensor could be or include an electromagnetic sensor, or perhaps make use of some other technology (e.g., Bluetooth) capable of detecting that the weapon is more than a threshold distance (or perhaps out of physical contact, etc.) with a corresponding sensor in a holster or the like. In some embodiments, the public-safety device 406 may be or include a weapon-fired sensor, capable of detecting that a gun or other weapon has been discharged. And certainly other weapon states could be detected as known in the art via suitable sensors. Such sensors would typically transmit on an event-driven basis (e.g., responsive to a weapon being drawn, a weapon being fired, and/or the like), and may also be configured to transmit period "keep alive" messages or the like, as is known to those of skill in the relevant art.

The public-safety devices 408 and 410 are depicted as being video and image cameras, respectively, and may be standalone devices that perform a video-capture and/or image-capture function, and that can also engage in wireless communications over the air interface 130 with the RANs 102. In some embodiments, one or both of a video-capture public-safety device and an image-capture public-safety device are part of a public-safety communication device such as a smartphone, tablet, or the like. Such a public-safety communication device would typically be an access terminal 110 that would communicate over the air interface 130 with the RANs 102, though in some cases might be a local device 112 (e.g., a Wi-Fi-only tablet) that would communicate via the local air interface 132 with the local device gateway 110GW, which in turn communicates over the air interface 130 with the RANs 102, and perhaps in turn with the computer 114 via the public-safety core network 104, as just one example. And other public-safety devices (e.g., sensors, monitors, and the like) are known to those of skill in the art, and could be used in a similar configuration as deemed suitable in a given context.

Figure 5:
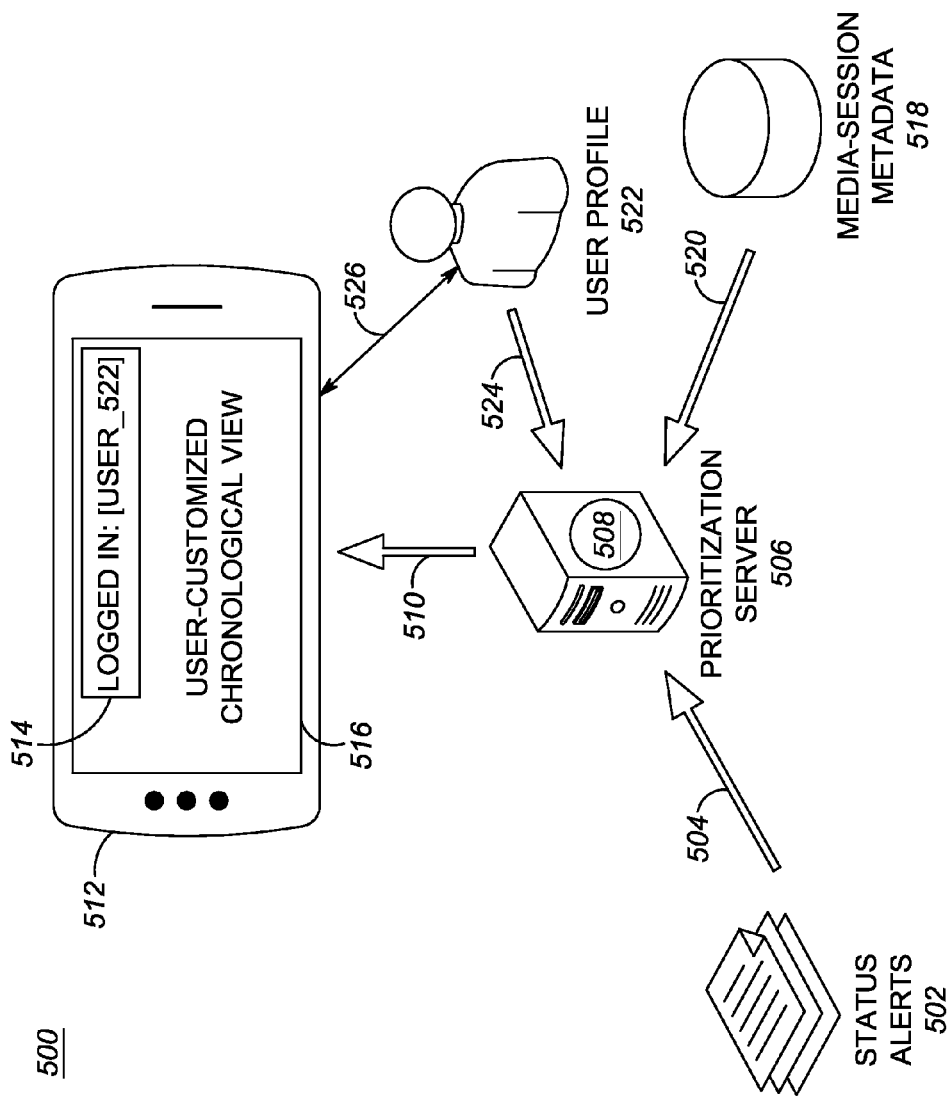
FIG. 5 depicts an example information-and-processing flow for presentation of prioritized media sessions on a user interface of a public-safety communication device.

FIG. 5 depicts an example information-and-processing flow for presentation of prioritized media sessions on a user interface of a public-safety communication device, in accordance with at least one embodiment. FIG. 5 is high-level and conceptual in nature, and various aspects that are depicted in FIG. 5 will become clearer with reference to the ensuing figures and their accompanying descriptions. In particular, FIG. 5 introduces without fully explaining at least the following terms and concepts that are more fully described in connection with later figures: status alerts, media-session metadata, prioritization server, user profile, and user-customized chronological view.

As shown in the example flow 500, one or more status alerts 502 are received by a prioritization server 506 (at 504), which also receives media-session metadata 518 (at 520), and a user profile 522 (at 524). The prioritization server 506 executes a process 508 to prioritize media sessions based at least in part on the status alerts 502, at least in part on the media-session metadata 518, and at least in part on the user profile 522. In various different embodiments, the prioritization of media sessions is carried out based on only one or two of those inputs, rather than based on all three; in embodiments in which one or two of those inputs is not used as a basis for media-session prioritization, the prioritization server may or may not receive those one or two inputs.

As is also depicted in the example flow 500, the prioritization server 506 presents (at 510) one or more of the prioritized media sessions on a user interface 516 of the public-safety communication device 512, which again could be a tablet, a smartphone, a laptop, a wearable display, or the like. As is depicted by the double arrow 526, the public-safety communication device 512 is associated with the user profile 522. As is depicted at 514, the user associated with user profile 522 is logged in to the public-safety communication device 512. Thus, the user-customized chronological view of prioritized media sessions that is presented on the user interface 516 is customized for the user associated with the user profile 522. As stated above, more context is developed below for the high-level, conceptual view of the flow 500 that is depicted in FIG. 5.

Figure 6:
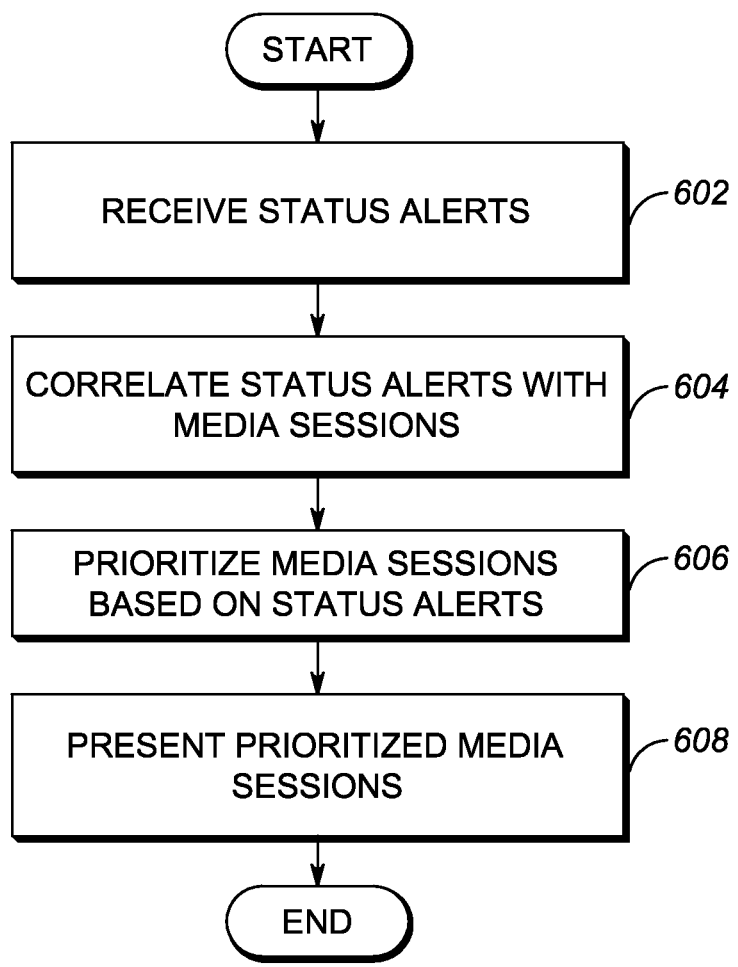
FIG. 6 depicts an example method.

FIG. 6 depicts an example method 600, which in at least one embodiment is carried out by a computing system such as the prioritization server 506, and is described as such in the ensuing description, though this is by way of example and not limitation.

At step 602, the prioritization server 506 receives one or more status alerts from one or more public-safety devices associated with one or more public-safety responders. In an example situation, a public-safety incident may be occurring at a particular location, and one or more public-safety responders may be on the scene, heading towards the scene, monitoring the status at the scene via one or more communication methods, and/or the like. Each status alert conveys some contextual information regarding a state of one or more public-safety devices, the occurrence of one or more events, and/or any other type of status-alert information deemed suitable by those of skill in the relevant art in a given context. Moreover, by way of example and not limitation, one or more of the public-safety devices could be wearable on a given responder, located in, on, or about a responder vehicle, affixed near a given responder (e.g., a mounted camera), flying near a responder (e.g., an unmanned aerial vehicle (UAV)), and/or in one or more other locations and/or configurations as deemed suitable by those of skill in the relevant art in a given context.

In at least one embodiment, at least one of the received status alerts indicates a state of one or more sensors of one or more of the public-safety devices, some possible examples of which are (i) one or more status alerts from the public-safety communication device 402 indicating one or more of dangerously low heart rate, dangerously high heart rate, and/or the like; (ii) one or more status alerts from the public-safety communication device 404 indicating one or more of a particular oxygen-tank level (e.g., absolute amount, percentage full, fraction full, etc.), an oxygen-tank-low alert, and/or the like; and (iii) one or more status alerts from the public-safety communication device 406 indicating one or more of weapon drawn, weapon discharged, and/or the like; certainly numerous other examples are possible and will be evident to those having skill in the relevant art; as but one non-limiting example, one or more of the status alerts could indicate the presence of a hazardous gas in a certain area, and/or one or more other ambient conditions, as deemed suitable by those of skill in the relevant art for a given implementation.

In at least one embodiment, at least one of the received status alerts indicates a state of at least one of the public-safety responders. Some example states of public-safety responders include officer running, officer down, officer exited vehicle, officer inside vehicle, and the like. Such status alerts may be received via one or more of what are known in the art as analytics, which in general are computing modules (e.g., software and/or firmware being executed by processing hardware) that receive what those in the art often refer to as "raw data," proceed to process that raw data to arrive at one or more determinations or conclusions, and then transmit one or more status alerts to the prioritization server 506, where those one or more transmitted status alerts are reflective of one or more of those determinations or conclusions. Examples of this raw data could include groundspeed, location, state of an accelerometer and/or gyroscopic device (e.g., in an officer or other responder's smartphone or elsewhere on their person), proximity (or lack of proximity) to, for example, an in-vehicle sensor or other transponder. And certainly other examples are possible and will be evident to those of skill in the art.

In at least one embodiment, at least one of the received status alerts indicates incident-definition data, where the indicated incident-definition data includes one or more of recentness of incident creation, incident type, an indication of users or equipment assigned to the incident, and incident location. A status alert that indicates incident creation may correspond to one or more dispatch personnel (hereinafter "dispatch") creating a new data record and/or a new incident identifier that corresponds to a public-safety incident that may have only recently begun. Dispatch may assign an incident type, perhaps triggering a status alert to be sent to the prioritization server 506; in some cases, an incident type may be automatically assigned, which may itself trigger a status alert to be sent to the prioritization server 506. A status alert may be sent in automated response to a location being associated (e.g., manually or automatically) with a given incident; in some cases, it may be the particular location (e.g., the town square, the governor's mansion, or the like) that triggers the sending of a status alert to the prioritization server 506; in some cases, it may not be location-dependent, in that it could be the mere fact that a location of a given incident has been determined and associated with the incident that triggers the sending of a status alert to the prioritization server 506. And certainly numerous other examples are possible.

As mentioned above, the one or more status alerts received by the prioritization server at step 602 are received from one or more public-safety devices associated with one or more public-safety responders. At step 604, the prioritization server 506 correlates one or more of those received status alerts with one or more media sessions that involve one or more of those public-safety responders. As mentioned generally herein, one or more of these public-safety responders could be police personnel, fire personnel, paramedic personnel, and/or one or more of any other type of public-safety personnel. A given responder may carry one or more communication devices, and may use such devices to engage in one or more media sessions such as voice calls, push-to-talk (PTT) sessions, video calls, video chats, instant messaging (IM) sessions, uploading one or more captured images, uploading one or more captured videos, and/or one or more other types of media sessions that are known to those of skill in the art.

In at least one embodiment, step 604 involves correlating one or more of the status alerts (received at step 602) with one or more of the media sessions based at least in part on one or more of timestamp data, location data, and an incident identifier. As is known in the art, media sessions quite often have associated metadata (i.e., media-session metadata) indicating parameters of the sessions such as time of day, date, location of one or more participants, and the like. In the public-safety context, one or more media sessions may have associated metadata that conveys an incident identifier associated with a particular public-safety incident. Moreover, one or more of the status alerts may include or be otherwise associated with one or more such data fields, indicating properties of the respective status alerts such as timestamp data regarding when they were sent and/or received, location data regarding from where the status alerts originated, an incident identifier that the status alert is associated with, and the like. In at least one embodiment, correlating status alerts with media sessions involves identifying that one or more status alerts and one or more responder-involved media sessions share a common timestamp, location, and/or incident identifier. And certainly there are numerous other dimensions along which status alerts and responder-involved media sessions could be correlated, as will be evident to those of skill in the relevant art.

At step 606, the prioritization server 506 prioritizes one or more of the media sessions based on prioritization criteria that includes the one or more status alerts correlated (at step 604) with those media sessions. In various different embodiments, prioritizing a media session may take forms such as marking prioritized media sessions with a Boolean flag, assigning to particular media sessions a relatively high value on a priority-value scale, and/or otherwise categorizing and/or ranking certain media sessions (from among all of the media sessions in a larger set) as prioritized. And while those are some options for how as a practical matter to prioritize some media sessions with respect to other media sessions, the substantive criteria on which such determinations are made could include a number of different possibilities as well, some of which are described below as used in certain embodiments to designate media sessions associated with certain status alerts as being prioritized media sessions.

As described above, in at least one embodiment, at least one of the received status alerts indicates a state of one or more sensors of one or more of the public-safety devices; in at least one such embodiment, the prioritization criteria utilized by the prioritization server 506 in step 606 includes that indicated status of the one or more sensors. As examples, a media session may be prioritized if that media session is correlated with a status alert related to a weapon being drawn or discharged. Certainly numerous other examples are possible.

As described above, in at least one embodiment, at least one of the received status alerts indicates a state of at least one of the public-safety responders; in at least one such embodiment, the prioritization criteria utilized by the prioritization server 506 in step 606 includes that indicated state of the at least one public-safety responder. As an example, a media session may be prioritized if that media session is correlated with a status alert related to an officer being down. And numerous other examples are possible.

As described above, in at least one embodiment, at least one of the received status alerts indicates incident-definition data that includes one or more of recentness of incident creation, incident type, an indication of users or equipment assigned to the incident, and incident location; in at least one such embodiment, the prioritization criteria utilized by the prioritization server 506 in step 606 includes that indicated incident-definition data. As just one example, a media session may be prioritized if that media session is correlated with a status alert related to an incident taking place at a critical location such as a courthouse or other government building. Certainly numerous other examples are possible.

In at least one embodiment, the prioritization criteria utilized by the prioritization server 506 in step 606 includes one or more of a given status alert originating from dispatch, a frequency of receipt of one or more of the status alerts, and a severity level of one or more of the status alerts. As one example, a media session may be prioritized if that media session is correlated with a status alert that the prioritization server 506 has received more than a threshold number of times in a given time period. As another example, a media session may be prioritized if that media session is correlated with a status alert that has an associated severity level that exceeds a certain threshold. And certainly numerous other examples are possible.

In at least one embodiment, the prioritization criteria utilized by the prioritization server 506 in step 606 includes media-session metadata associated with the one or more media sessions. Thus, in at least one embodiment, media sessions are prioritized based at least in part on status alerts and at least in part on metadata associated with the media sessions themselves. Some examples follow.

In at least one embodiment in which the prioritization criteria utilized by the prioritization server 506 in step 606 includes media-session metadata associated with the one or more media sessions, that media-session metadata indicates—with respect to corresponding media sessions—one or more of start time, stop time, duration, listing of participants, identification of media-session initiator, identification of source (e.g., person, agency, or the like) of media-session content, location of one or more participants, agency role (e.g., police officer) of one or more participants, incident role (e.g., designated incident commander in connection with a given incident) of one or more participants, training history and/or certifications (e.g., CPR, handling hazardous chemicals, etc.) of one or more participants, work history (e.g., involvement in prior similar incidents) of one or more participants, communication channel (e.g., a channel designated for use by high-ranking personnel), and a group identifier (e.g., an identifier of a semi-permanent or dynamically created PTT talkgroup or the like). And certainly there are numerous other examples of media-session metadata upon which prioritization determinations could be based, as known to those having skill in the relevant art.

In at least one embodiment in which the prioritization criteria utilized by the prioritization server 506 in step 606 includes media-session metadata associated with the one or more media sessions, that media-session metadata—upon which prioritization determinations are at least in part based—includes data derived from applying to one or more of the media sessions one or more of speech-data analysis, video-data analysis, image-data analysis, object-recognition analysis, activity-recognition analysis, and textual analysis, and the prioritization criteria includes that derived data. And certainly other analytics could be applied to media sessions, as known to those having skill in the art. A non-exhaustive list of data that may be derived using such analytics and then incorporated into the prioritization criteria includes an identification of one or more of a weapon, an object of interest, a person of interest, a voice of interest, a word of interest, a phrase of interest, a location of interest, a building of interest, a vehicle of interest, and a situation of interest (e.g., a riot). And certainly numerous other examples are possible as well.

In at least one embodiment in which the prioritization criteria utilized by the prioritization server 506 in step 606 includes media-session metadata associated with the one or more media sessions, the following function is also carried out: tracking viewing data for inclusion in the media-session metadata upon which prioritization determinations are at least in part based. That viewing data includes one or more of total number of viewings, frequency of viewings, recentness of most recent viewing, and identification of one or more viewers; moreover, in such embodiments, the prioritization criteria includes the tracked viewing data. As an example, a media session could be prioritized if, among other reasons, that media session had been viewed more than a threshold number of times in a recent time period, viewed less than a threshold time period ago, and/or viewed by one or more particular viewers (e.g., an incident commander, police chief, fire chief, or the like). And certainly numerous other examples are possible.

In at least one embodiment in which the prioritization criteria utilized by the prioritization server 506 in step 606 includes media-session metadata associated with the one or more media sessions, that media-session metadata—upon which prioritization determinations are at least in part based—includes data indicative of a stress level of one or more individuals, and the prioritization criteria includes the one or more indicated stress levels. Thus, a media session could be prioritized if, among other reasons, one or more analytics indicated that the speaker was under duress. Such a determination could be made using one or more analytics to process audio data, video data, and/or the like. And certainly numerous other examples are possible as well.

In at least one embodiment, the prioritization criteria utilized by the prioritization server 506 in step 606 includes a user-profile record that is associated with the public-safety communication device. Thus, in at least one embodiment, media sessions are prioritized based at least in part on status alerts and at least in part on an a user-profile record that is associated with the public-safety communication device. Moreover, in at least one embodiment, media sessions are prioritized based on status alerts, media-session metadata, and a user-profile record that is associated with the public-safety communication device. Some examples follow that involve prioritizing media sessions based at least in part on a user-profile record that is associated with the public-safety communication device.

In at least one embodiment in which the prioritization criteria utilized by the prioritization server 506 in step 606 includes a user-profile record that is associated with the public-safety communication device, that user-profile record includes data indicative of one or more of a user identifier (e.g., username, e-mail address, and the like), a user identity (e.g., a person's name), an agency affiliation (e.g., police), an agency role (e.g., officer), an incident role (e.g., incident commander), a rank (e.g., lieutenant), a group identifier (e.g., a semi-permanent or dynamic talkgroup identifier), preferences indicating status alerts and media-session metadata of interest, and a hierarchical relationship (e.g., an identification of a direct or indirect supervisor of the user associated with the user-profile record). Any one or more of these can be used in various different embodiments as inputs into the prioritization determinations regarding media sessions; i.e., as part of the prioritization criteria. And certainly numerous other examples are possible as well.

In at least one embodiment in which the prioritization criteria utilized by the prioritization server 506 in step 606 includes a user-profile record that is associated with the public-safety communication device, that user-profile record includes data indicative of a rule set associated with the user-profile record. The user-profile record could include the rule set itself, or perhaps a reference or other pointer to a rule set stored on a specified server, as examples. This rule set could include all manner of prioritization-related rules, some of which might be user-configurable, some of which might not be (i.e., some of which might be pushed to the profile and/or associated public-safety communication device by (or at the behest of) one or more individuals higher in a chain of command). And certainly numerous other examples are possible.

At step 608, the prioritization server 506 presents one or more of the prioritized media sessions in a chronological view on the user interface 516 of the public-safety communication device 512. In various different embodiments, a single public-safety responder could have (i.e., be associated with) one public-safety communication device, or multiple public-safety communication devices. In at least some embodiments in which a given responder in fact does have multiple such devices, step 506 involves presenting the prioritized media sessions on one or more of those multiple devices; in some such embodiments, step 506 involves presenting the prioritized media sessions on all of those multiple devices; in some such embodiments, step 506 involves presenting the prioritized media sessions in different ways on different ones of the multiple devices. And certainly other possible examples could be listed.

Furthermore, presenting a media session in step 506 may take various forms, some examples of which are described below in connection with the ensuing figures. In some embodiments, the only media sessions that are presented on the user interface 516 are those that have been prioritized; i.e., in those embodiments, selection for presentation is akin to prioritization. In other embodiments, one or more media sessions other than the one or more presented prioritized media sessions are also presented on the user interface 516 of the public-safety communication device 512; in such embodiments, the step of presenting one or more prioritized media sessions involves emphasizing (e.g., highlighting, bolding, starring, and/or the like) via the user interface 516 the one or more presented prioritized media sessions with respect to the one or more other media sessions. Presenting a media session could take visual forms such as representations on one or more displays, and such visual forms could in some cases include links to cause visual and/or audible playout of one or more such media sessions. Also or instead, presenting a media session can be done in a non-audible manner; as one example, an audible and/or tactile alert may be followed by an audible playout of a given talkburst or the like. And certainly numerous other manners of presenting prioritized media sessions on a user interface could be implemented, as known to those having skill in the relevant art.

Moreover, in at least one embodiment, the step of presenting one or more of the prioritized media sessions involves presenting at least one status alert as being correlated with at least one of the presented prioritized media sessions. Recall that step 604 involves correlating status alerts with media sessions, and that step 606 involves prioritizing media sessions (i.e., media sessions correlated with status alerts); as such, in at least one embodiment, step 608 involves presenting at least one status alert—via the user interface 516—as being correlated with at least one of the presented prioritized media sessions. In some such embodiments, a visual link (e.g., a line, a similar color, and/or the like) is presented to visually connect a given status alert with a given prioritized media session with which that given status alert has been correlated.

FIGS. 7-10 depict various different examples of ways in which prioritized media sessions could be presented in a chronological view on the user interface 516 of the public-safety communication device 512.

Figure 7:
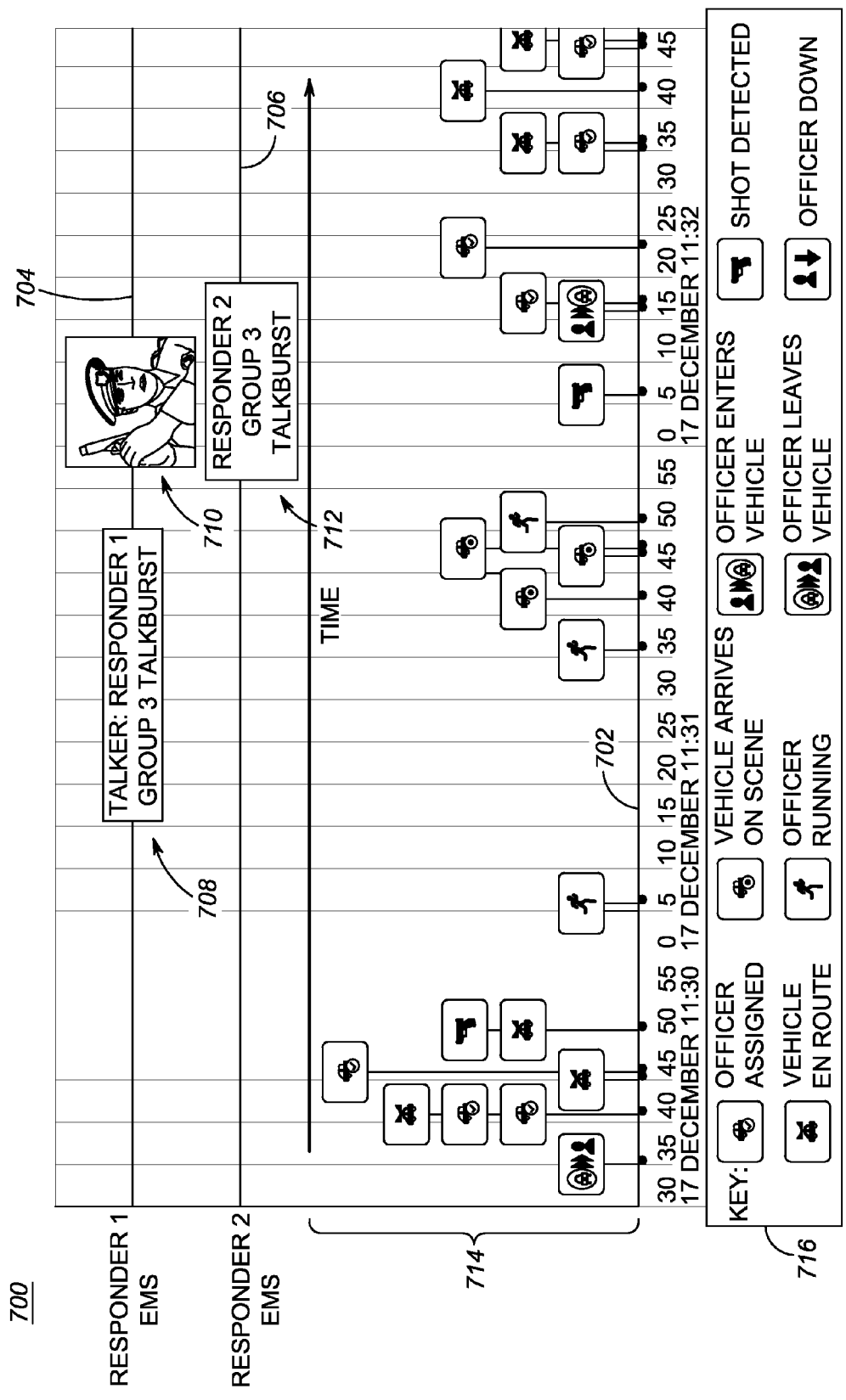
FIG. 7 depicts a first example chronological view on a user interface.

FIG. 7 depicts a first such example view 700 that includes a horizontal time axis 702, showing some sequential times of day on an example date. Also depicted is a first responder's media-session axis 704 and a second responder's media-session axis 706. Axis 704 has on it two presented media sessions: a talkburst 708 and a video 710. Axis 706 has on it one presented media session: a talkburst 712. All three of the media sessions 708, 710, and 712 that are presented in the example view 700 are prioritized media sessions, and no non-prioritized media sessions are presented in the example view 700. Also presented on the example view 700 are a number of status alerts 714; these status alerts 714 are presented using symbols that appear below in a view key 716. As can be seen in the view 700, the presented status alerts 714 are presented at the various times (on the time axis 702) at which these status alerts were sent and/or received. And certainly numerous other examples are possible as well.

Figure 8:
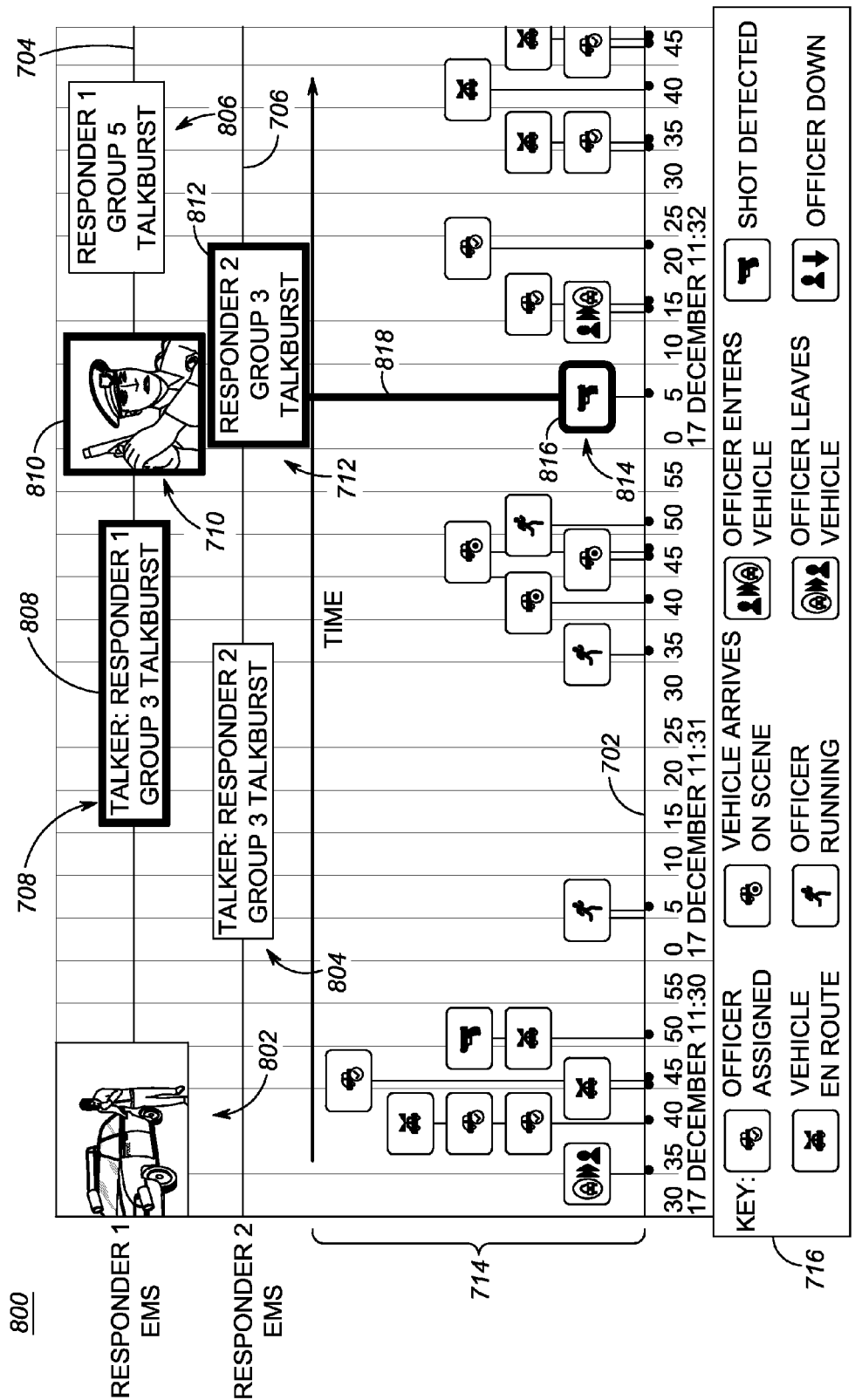
FIG. 8 depicts a second example chronological view on a user interface.

FIG. 8 depicts an example view 800 that differs from the example view 700 in only a few ways; it is those differences that are discussed here. The view 800, unlike the view 700, includes several presented non-prioritized media sessions: 802, 804, and 806. Furthermore, the prioritized media sessions—which are still media sessions 708, 710, and 712 from FIG. 7—have respective highlighting 808, 810, and 812. Moreover, a particular status alert 814 has highlighting 816, and further has a visual link 818 connecting the status alert 814 to the media session 812, showing in this example that the prioritized media session 712 has been correlated by the system with the "shot detected" status alert 814, likely indicating that the media session 812 includes recorded words (being spoken by and/or to responder 2) and/or other audio from at or very near the time that the shot was detected that triggered the status alert 814. And certainly numerous other examples are possible, as these are provided by way of example and not limitation.

Figure 9:
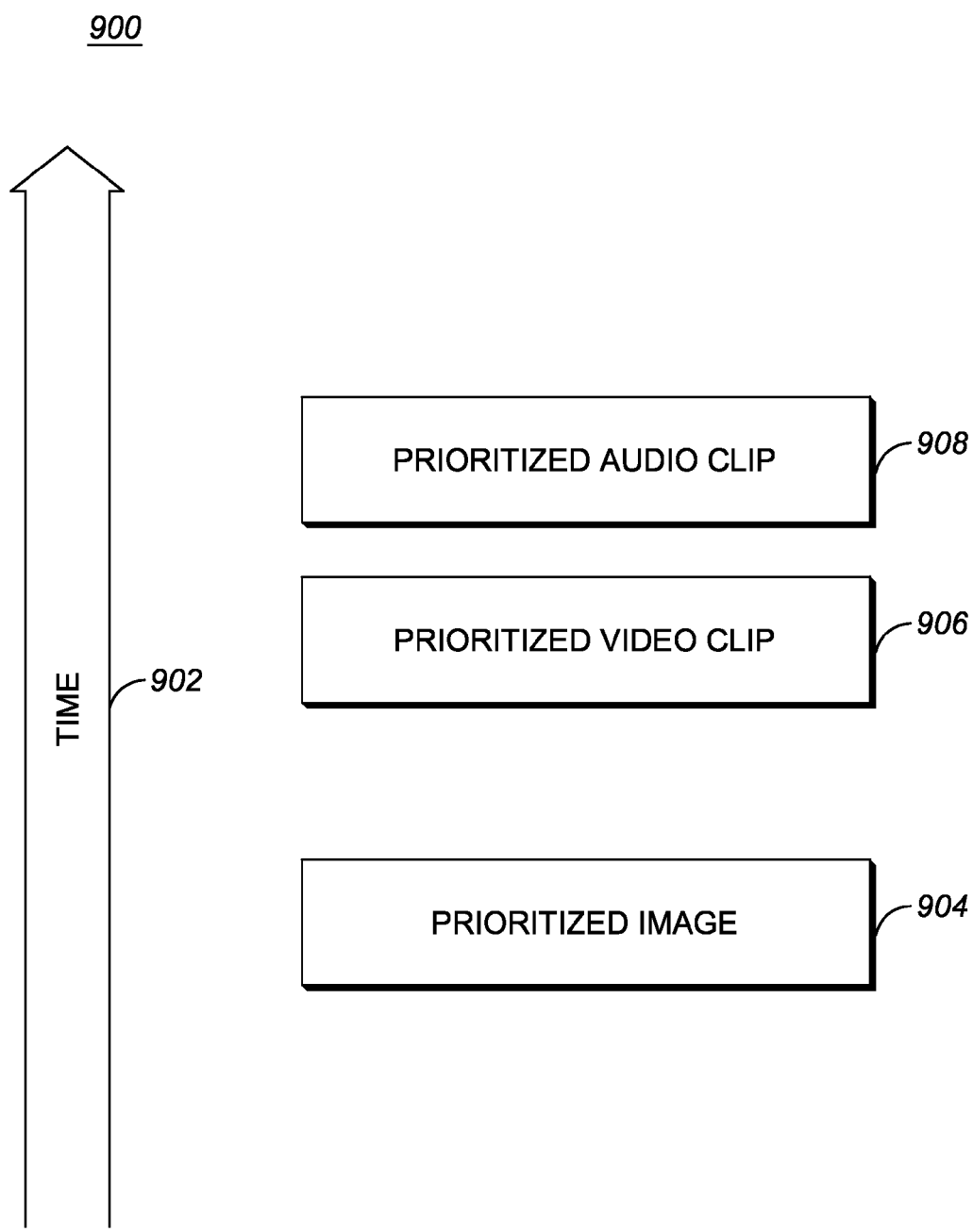
FIG. 9 depicts a third example chronological view on a user interface.
Figure 10:
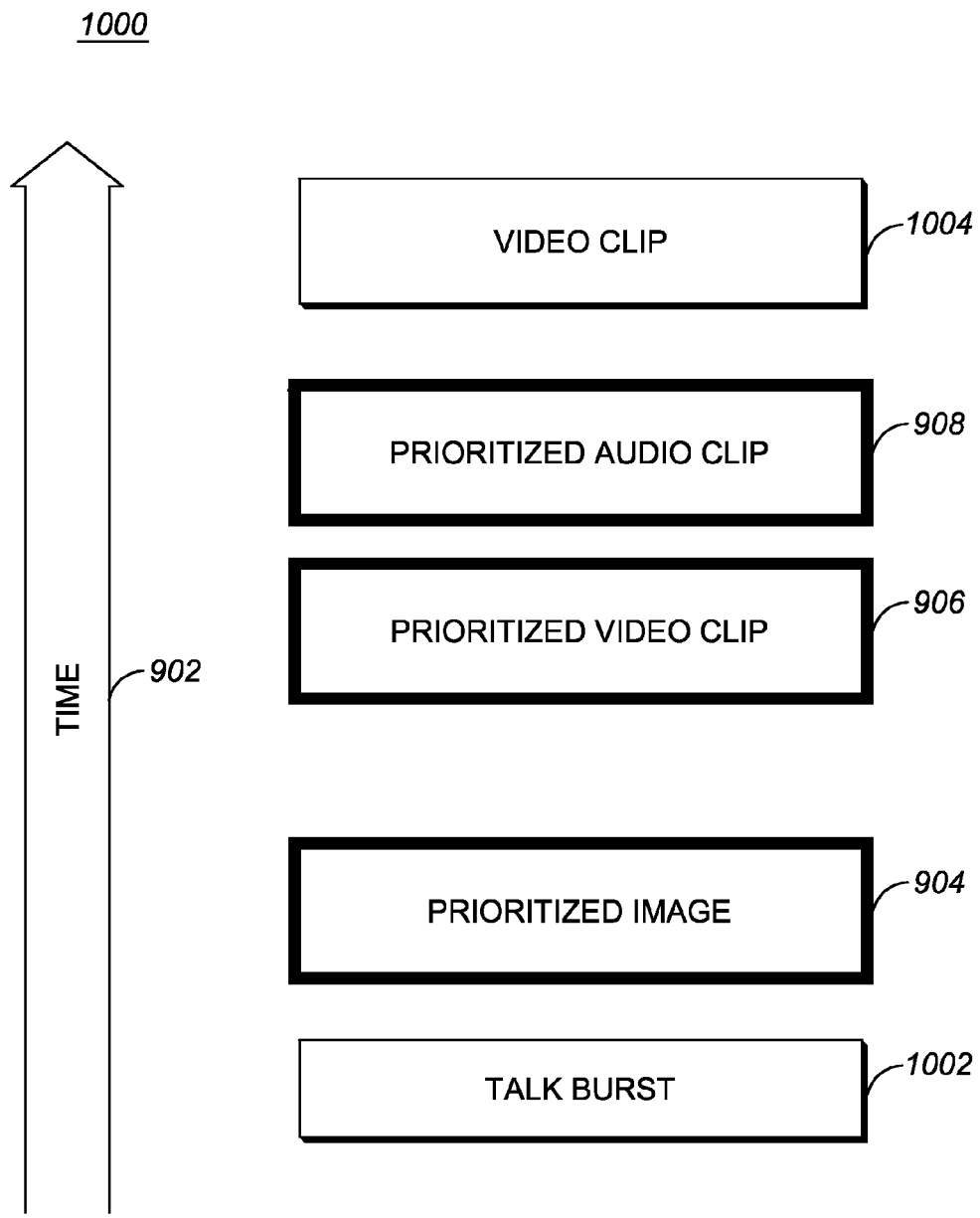
FIG. 10 depicts a fourth example chronological view on a user interface.

Moreover, FIGS. 9 and 10 depict different examples of chronological views that could be presented on the user interface 516 of the public-safety communication device 512. The example views 900 and 1000 that are presented in FIGS. 9 and 10, respectively, are simpler overall than the example views 700 and 800 that are depicted in FIGS. 7 and 8, respectively. The views 900 and 1000 both depict time on a vertical time axis 902 as opposed to the horizontal time axis 702 that is depicted in the views 700 and 800. The view 900 of FIG. 9 depicts three media sessions: a prioritized image 904, a prioritized video clip 906, and a prioritized audio clip 908. As is indicated by those labels, all three of the media sessions 904, 906, and 908 are prioritized media sessions; this is similar to the view 700, where all three presented media sessions were prioritized media sessions. The view 1000 is analogous in some ways, then, to the view 800, in that the view 1000 includes the prioritized media sessions 904, 906, and 908 from the view 900, and also includes two non-prioritized media sessions: a talkburst 1002 and a video clip 1004. As can be seen in FIG. 10, the prioritized media sessions 904, 906, and 908 are indicated as prioritized with their highlighted borders. And certainly numerous other examples are possible, as deemed suitable by those having skill in the art for a given implementation or in a given context.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving one or more status alerts from one or more public-safety devices associated with one or more public-safety responders;
    correlating one or more of the received status alerts with one or more media sessions involving one or more of the public-safety responders;
    prioritizing one or more of the media sessions based on prioritization criteria that includes the one or more status alerts correlated with those media sessions; and
    presenting one or more of the prioritized media sessions in a chronological view on respective user interfaces of one or more public-safety communication devices;
    wherein the prioritization criteria further includes media-session metadata associated with the one or more media sessions; and
    further comprising tracking viewing data for inclusion in the media-session metadata, the viewing data including one or more of total number of viewings, frequency of viewings, recentness of most recent viewing, and identification of one or more viewers, wherein the prioritization criteria further includes the tracked viewing data.

2. The method of claim 1, wherein correlating one or more of the received status alerts with one or more of the media sessions comprises correlating one or more of the received status alerts with one or more of the media sessions based at least in part on one or more of timestamp data, location data, and an incident identifier.

3. The method of claim 1, wherein at least one of the received status alerts indicates a state of one or more sensors of one or more of the public-safety devices, wherein the prioritization criteria further includes the indicated status of the one or more sensors.

4. The method of claim 1, wherein at least one of the received status alerts indicates a state of at least one of the public-safety responders, wherein the prioritization criteria further includes the indicated state of the at least one public-safety responder.

5. The method of claim 1, wherein at least one of the received status alerts indicates incident-definition data, wherein the prioritization criteria further includes the indicated incident-definition data, wherein the indicated incident-definition data includes one or more of recentness of incident creation, incident type, an indication of users or equipment assigned to the incident, and incident location.

6. The method of claim 1, wherein the prioritization criteria further includes one or more of a given status alert originating from dispatch, a frequency of receipt of one or more of the status alerts, and a severity level of one or more of the status alerts.

7. The method of claim 1, wherein the media-session metadata indicates one or more of start time, stop time, duration, listing of participants, identification of media-session initiator, identification of source of media-session content, location of one or more participants, agency role of one or more participants, incident role of one or more participants, training history of one or more participants, work history of one or more participants, certifications of one or more participants, communication channel, and a group identifier.

8. The method of claim 1, wherein the media-session metadata includes data derived from applying to one or more of the media sessions one or more of speech-data analysis, video-data analysis, image-data analysis, object-recognition analysis, activity-recognition analysis, and textual analysis, wherein the prioritization criteria further includes the derived data.

9. The method of claim 8, wherein the derived data indicates an identification of one or more of a weapon, an object of interest, a person of interest, a voice of interest, a word of interest, a phrase of interest, a location of interest, a building of interest, a vehicle of interest, and a situation of interest.

10. The method of claim 1, wherein the media-session metadata includes data indicative of a stress level of one or more individuals, wherein the prioritization criteria further includes the one or more indicated stress levels.

11. The method of claim 1, wherein the prioritization criteria further includes a user-profile record that is associated with the public-safety communication device.

12. The method of claim 11, wherein the user-profile record comprises data indicative of one or more of a user identifier, a user identity, an agency affiliation, an agency role, an incident role, a rank, a group identifier, and a hierarchical relationship.

13. The method of claim 11, wherein the user-profile record comprises data indicative of a rule set associated with the user-profile record.

14. The method of claim 13, wherein at least part of the rule set is user-configurable.

15. The method of claim 13, wherein at least part of the rule set is not user-configurable.

16. The method of claim 1, further comprising presenting one or more media sessions other than the prioritized media sessions, wherein presenting one or more of the prioritized media sessions comprises emphasizing via the user interface the one or more presented prioritized media sessions with respect to the one or more other media sessions.

17. The method of claim 1, wherein presenting one or more of the prioritized media sessions comprises presenting at least one status alert as being correlated with at least one of the presented prioritized media sessions.

18. A system comprising:
   a communication interface;
   a processor; and
   data storage containing instructions executable by the processor for causing the system to carry out a set of functions, the set of functions including:
   receiving one or more status alerts from one or more public-safety devices associated with one or more public-safety responders;
   correlating one or more of the received status alerts with one or more media sessions involving one or more of the public-safety responders;
   prioritizing one or more of the media sessions based on prioritization criteria that includes the one or more status alerts correlated with those media sessions wherein the prioritization criteria further includes media-session metadata associated with the one or more media sessions;
   presenting one or more of the prioritized media sessions in a chronological view on respective user interfaces of one or more public-safety communication devices, and
   tracking viewing data for inclusion in the media-session metadata, the viewing data including one or more of total number of viewings, frequency of viewings, recentness of most recent viewing, and identification of one or more viewers, wherein the prioritization criteria further includes the tracked viewing data.

* * * * *